(12) United States Patent
Theilen

(10) Patent No.: US 7,597,361 B2
(45) Date of Patent: Oct. 6, 2009

(54) BULKHEAD FITTING FOR AN IRRIGATION PIPE

(75) Inventor: Dennis R. Theilen, Omaha, NE (US)

(73) Assignee: Valmont Industries, Inc., Valley, NE (US)

( * ) Notice: Subject to any disclaimer, the term of this patent is extended or adjusted under 35 U.S.C. 154(b) by 542 days.

(21) Appl. No.: 11/451,758

(22) Filed: Jun. 13, 2006

(65) Prior Publication Data

US 2008/0030021 A1    Feb. 7, 2008

(51) Int. Cl.
*F16L 41/00* (2006.01)
(52) U.S. Cl. .................. 285/206; 285/139.2; 285/139.3
(58) Field of Classification Search .............. 285/5, 285/89, 81, 139.2, 139.3, 141.1, 139.1, 205, 285/208, 55, 45, 206, 189, 92
See application file for complete search history.

(56) References Cited

U.S. PATENT DOCUMENTS

| | | | | |
|---|---|---|---|---|
| 2,837,134 A | * | 6/1958 | Steer | ........................... 152/427 |
| 3,195,932 A | * | 7/1965 | Morton | ......................... 285/200 |
| 3,230,975 A | * | 1/1966 | Mercier | ......................... 138/30 |
| 4,613,169 A | * | 9/1986 | Engelhart | ................. 285/139.2 |
| 5,938,127 A |   | 8/1999 | Kosch et al. | ................. 239/723 |
| 6,076,571 A | * | 6/2000 | Burns et al. | .................. 141/383 |
| 6,508,490 B1 | * | 1/2003 | Hoffman | ...................... 285/24 |
| 6,676,168 B2 |   | 1/2004 | McAliley | ..................... 285/206 |

* cited by examiner

*Primary Examiner*—Aaron M Dunwoody
*Assistant Examiner*—Gwendolyn Fournet
(74) *Attorney, Agent, or Firm*—Dennis L. Thomte; Thomte Patent Law Office LLC

(57) ABSTRACT

A bulkhead fitting which may be used on either six inch or eight inch diameter irrigation pipes through the use of an interchangeable base ring. The fitting includes a stem fitting having an interchangeable base ring mounted thereon which is extended upwardly through an outlet opening in an irrigation pipe. An upper washer is mounted on the stem portion of the stem fitting and is maintained thereon through the use of a nut which is threadably mounted on the upper end of the stem fitting. A locking mechanism is provided which prevents the inadvertent loosening of the nut with respect to the stem fitting.

11 Claims, 9 Drawing Sheets

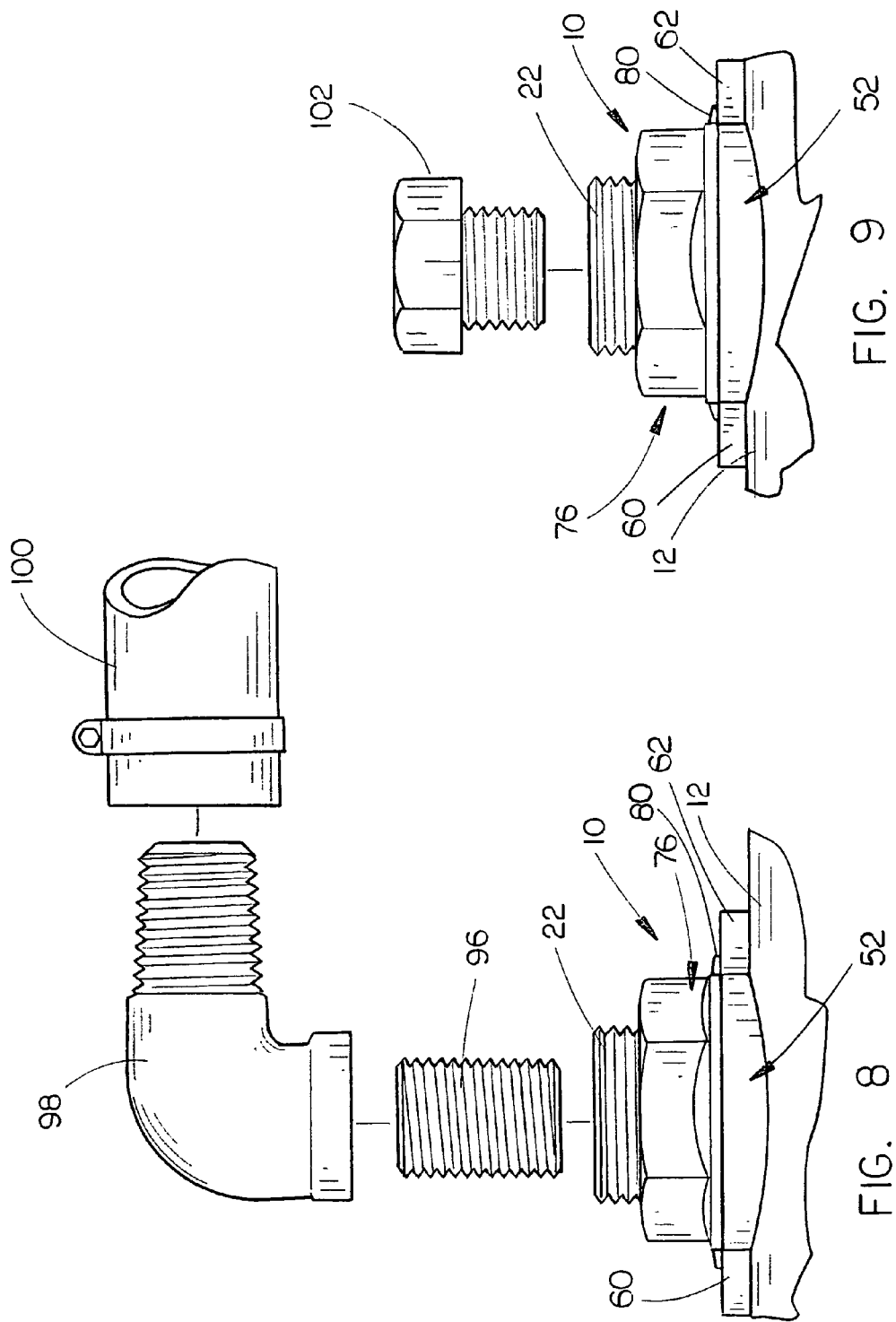

BULKHEAD FITTING FOR AN IRRIGATION PIPE

BACKGROUND OF THE INVENTION

1. Field of the Invention

This invention relates to a bulkhead fitting or outlet for connecting spray nozzles, drop tubes, drop hoses or the like to an irrigation pipeline wherein the irrigation pipe is lined with a plastic material.

2. Description of the Related Art

In mechanized irrigation systems such as center pivot irrigation systems or linear move irrigation systems, the main pipeline or water supply pipe is supported on a plurality of spaced-apart drive towers. To facilitate the sprinkling or spraying of water onto the area to be irrigated beneath the irrigation system, a plurality of spaced-apart sprinkler nozzles are connected to the water supply pipe. In some cases, the nozzles are positioned on the upper portion of the water supply pipe. In other instances, inverted, U-shaped drop tubes or drop hoses are used which extend from the water supply pipe to a location below the pipe with the lower end of the drop tube or drop hose having a sprinkler nozzle mounted thereon. Each of the sprinkler nozzles, drop tubes or drop hoses is normally placed in communication with the interior of the water supply pipe by first cutting an opening in the pipe at the desired location and then welding an internally threaded outlet to the exterior surface of the pipe so that the interior of the outlet communicates with the opening in the pipe, and then threadably inserting the nozzle or drop tube into the outlet. For example, see U.S. Pat. No. 5,938,127.

In many instances where the irrigation system is being used, the water to be irrigated is highly corrosive which substantially reduces the life of the irrigation system. In an effort to prevent the metal pipeline from coming into contact with the corrosive water being irrigated, the pipeline is sometimes lined with a polyethylene material which makes it impossible to weld the bulkhead fitting or outlet fitting to the pipe. In those systems where the pipeline is lined with a plastic material, drop hoses are normally used so that the corrosive water is discharged from the system below the pipeline.

Certain bulkhead fittings or outlets have been previously provided in poly-lined pipelines which do not require that the fittings or outlets be welded to the pipeline. However, the prior art bulkhead fittings are normally only useable with a pipe having a particular internal diameter. For example, a particular bulkhead fitting may be designed for use with a pipe having an eight inch internal diameter, but the same will not work with a pipe having a nine or ten inch internal diameter since pipes of different diameters have different internal radii.

SUMMARY OF THE INVENTION

A bulkhead fitting or outlet is described which is used with a tubular irrigation pipe having a first predetermined inside diameter, an outside surface, an inner surface, and at least one outlet opening formed therein. The fitting includes a hollow stem having a disc-shaped base portion with a stem portion extending upwardly therefrom. The stem fitting has a central opening extending therethrough with the stem portion having an outside diameter which is less than the diameter of the base portion thereof. The base portion of the stem fitting has a diameter which is greater than the diameter of the outlet opening formed in the pipe. The stem portion of the stem fitting has an externally threaded portion and an internally threaded portion provided thereon. A ring-shaped base ring, having a lower face and an upper face, is removably positioned on the base portion of the stem fitting. The lower face of the base ring is complementary in shape to the base portion. The upper face of the base ring is complementary in shape to the inner surface of the pipe having a predetermined inside diameter. The upper face of the base ring has a recessed area formed therein which receives a seal washer positioned therein. An O-ring is positioned between the base ring and the stem fitting to provide a seal therebetween. The hollow stem fitting is positioned in the outlet opening of the pipe so that the base portion, base ring, O-ring and seal washer are positioned within the pipe with the stem fitting extending upwardly and outwardly through the outlet opening. A generally ring-shaped upper washer is mounted on the stem portion outwardly of the pipe and has upper and lower faces. The lower face of the upper washer is complementary in shape to the outer surface of the pipe. The upper face of the upper washer is generally flat. A nut is threadably mounted on the externally threaded portion of the stem portion to sealably maintain the hollow stem fitting on the pipe so that sprinkler plumbing may be threadably received by the internally threaded portion of the stem portion. In the preferred embodiment, the nut and the upper washer have cooperating selective nut locking means provided thereon. Prior to installing the fitting on the pipe, the base ring of the invention may be removed from the stem fitting to permit another base ring to be substituted therefore if the pipe is of a different diameter than the first predetermined inside diameter.

It is therefore a principal object of the invention to provide an improved bulkhead fitting of the type described.

Yet another object of the invention is to provide a bulkhead fitting of the type described which includes a base ring which may be removed from a stem fitting to permit another base ring to be substituted therefore to accommodate pipes of different diameters.

A further object of the invention is to provide a bulkhead fitting which may be easily adapted to fit pipes of different diameters.

Yet another object of the invention is to provide a bulkhead fitting which may be used with poly-lined irrigation pipes.

Still another object of the invention is to provide bulkhead fitting which includes a locking means that prevents the fitting from loosening during use.

These and other objects will be apparent to those skilled in the art.

BRIEF DESCRIPTION OF THE DRAWINGS

FIG. 8 is a partial side view illustrating optional plumbing for the fitting;

FIG. 9 is a partial side view illustrating optional plumbing for the fitting.

DETAILED DESCRIPTION OF THE INVENTION

Figure 1:
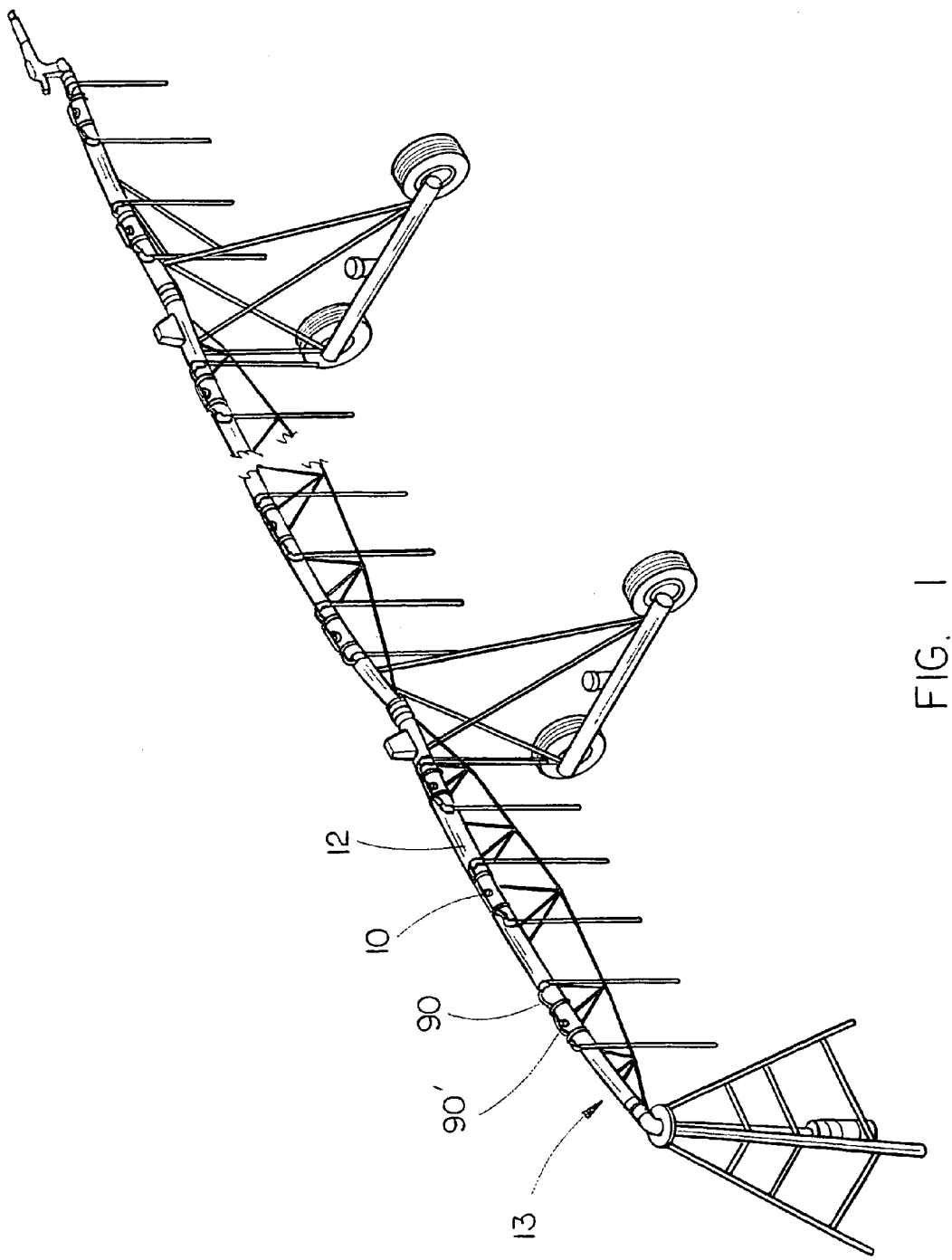
FIG. 1 is a perspective view of a mechanism irrigation system utilizing the fittings or outlets of this invention.
Figure 2:
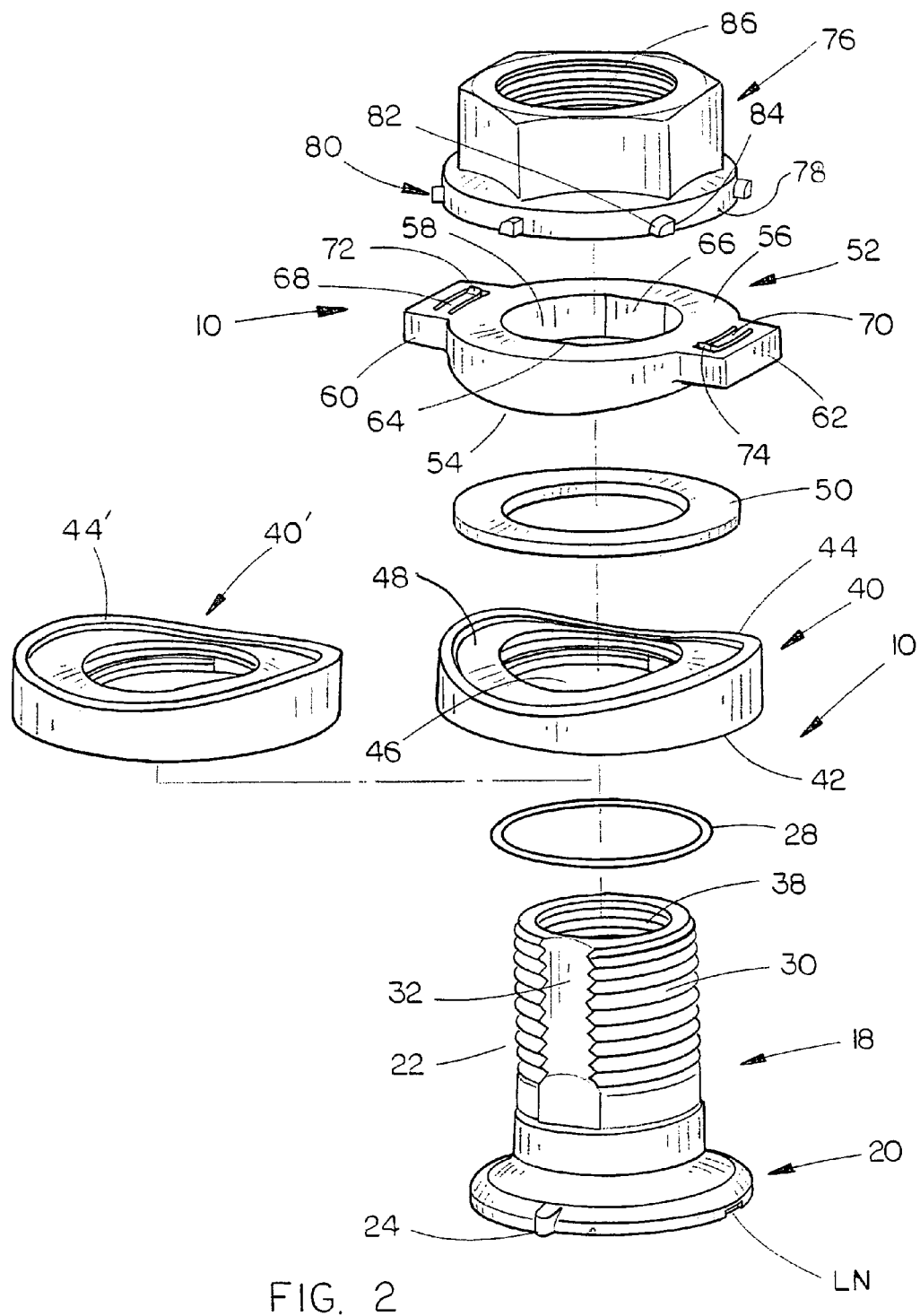
FIG. 2 is an exploded perspective view of the fitting of this invention and which illustrates the use of an interchangeable base ring.
Figure 3:
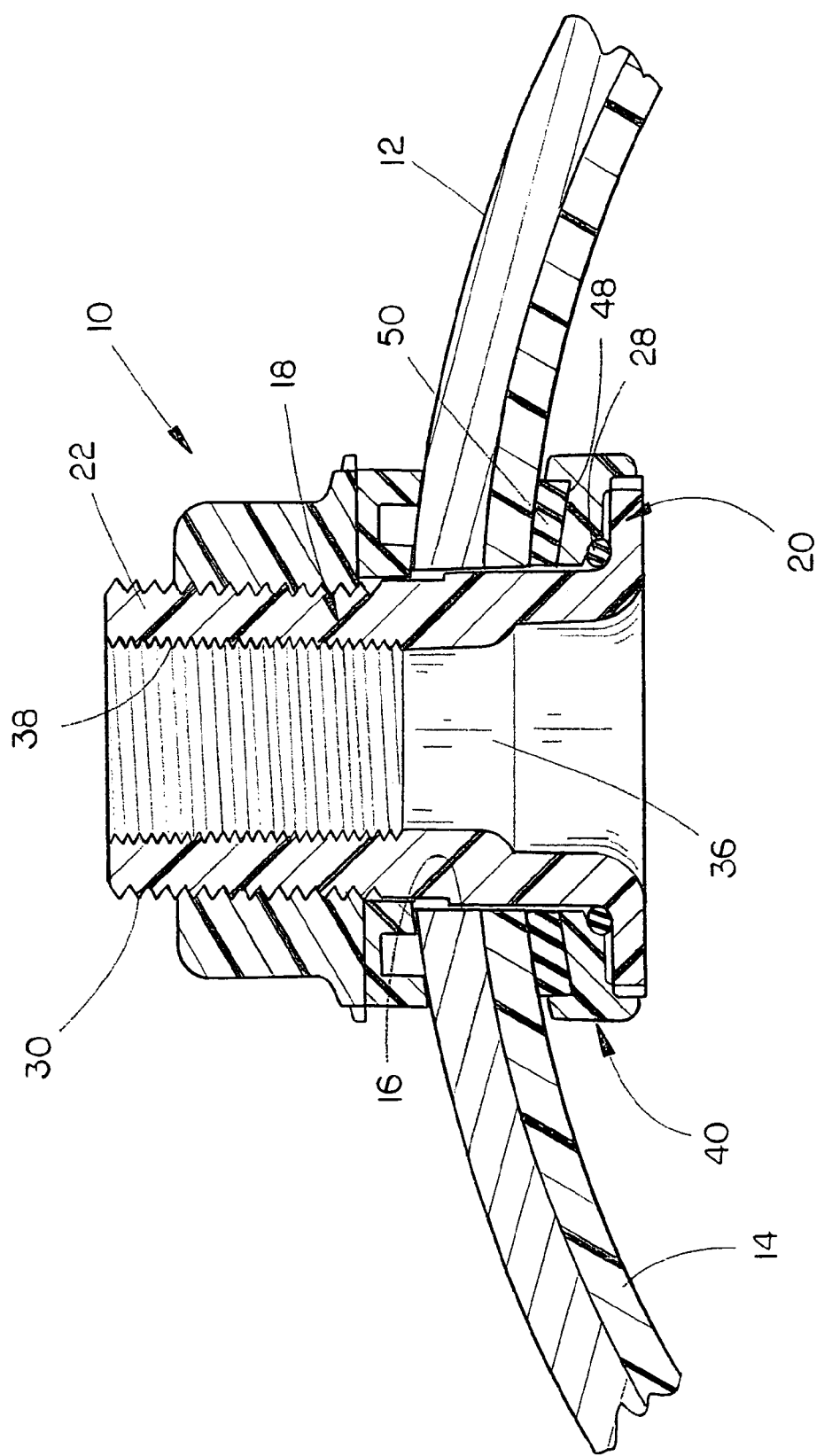
FIG. 3 is a sectional view of the fitting of this invention mounted on a lined irrigation pipe.

The bulkhead fitting or outlet of this invention is referred to generally by the reference numeral 10 and is designed to be used in conjunction with an irrigation pipe 12 utilized in mechanized irrigation systems 13 such as a center pivot irrigation system, a linear irrigation system, etc. More particularly, the fitting 10 is designed to be used with irrigation pipes having a plastic liner 14 therein when the irrigation water is corrosive. Even more particularly, the fitting 10 may be used on different diameter pipes by substituting different base rings in the fitting 10, as will be described hereinafter. In the description of the fitting 10, the fitting will be described as having upper and lower ends and being mounted on the upper end of the pipe, but it is perhaps possible that the fitting 10 could be positioned at the underside of the pipe 12 which means that the upper end of the fitting 10 would be the lower end of the fitting 10 in that situation.

Pipe 12 is tubular and will normally have an inside diameter of either six inches or eight inches. Accordingly, the inside radius of a six inch diameter pipe will be smaller than the inside radius of an eight inch diameter pipe. Pipe 12 is provided with a plurality of horizontally spaced-apart openings 16 formed therein into which the fittings 10 are positioned. Although the pipe 12 is described as having a six inch or eight inch diameter, pipe 12 could have other diameters as well.

Fitting 10 is comprised of a plastic material such as nylon and includes a stem fitting 18. Stem fitting 18 includes a base portion 20 having a stem portion 22 extending upwardly therefrom. A pair of protrusions 24, 26 extend laterally from the rim or periphery of base portion 20 for a purpose to be described hereinbelow. The rim or periphery of base portion 20 is also provided with a pair of spaced-apart locking notches LN formed therein. An O-ring 28 is positioned on stem fitting 18 at the juncture of the stem portion of stem portion 22 and base portion 20. Stem portion 22 is provided with an external buttress threaded portion 30 at its upper end. Stem portion 22 is also provided with opposing flats 32 and 34 formed therein. Stem fitting 18 has a central opening 36 extending therethrough having an internally threaded portion 38 at the upper end thereof.

Figure 4:
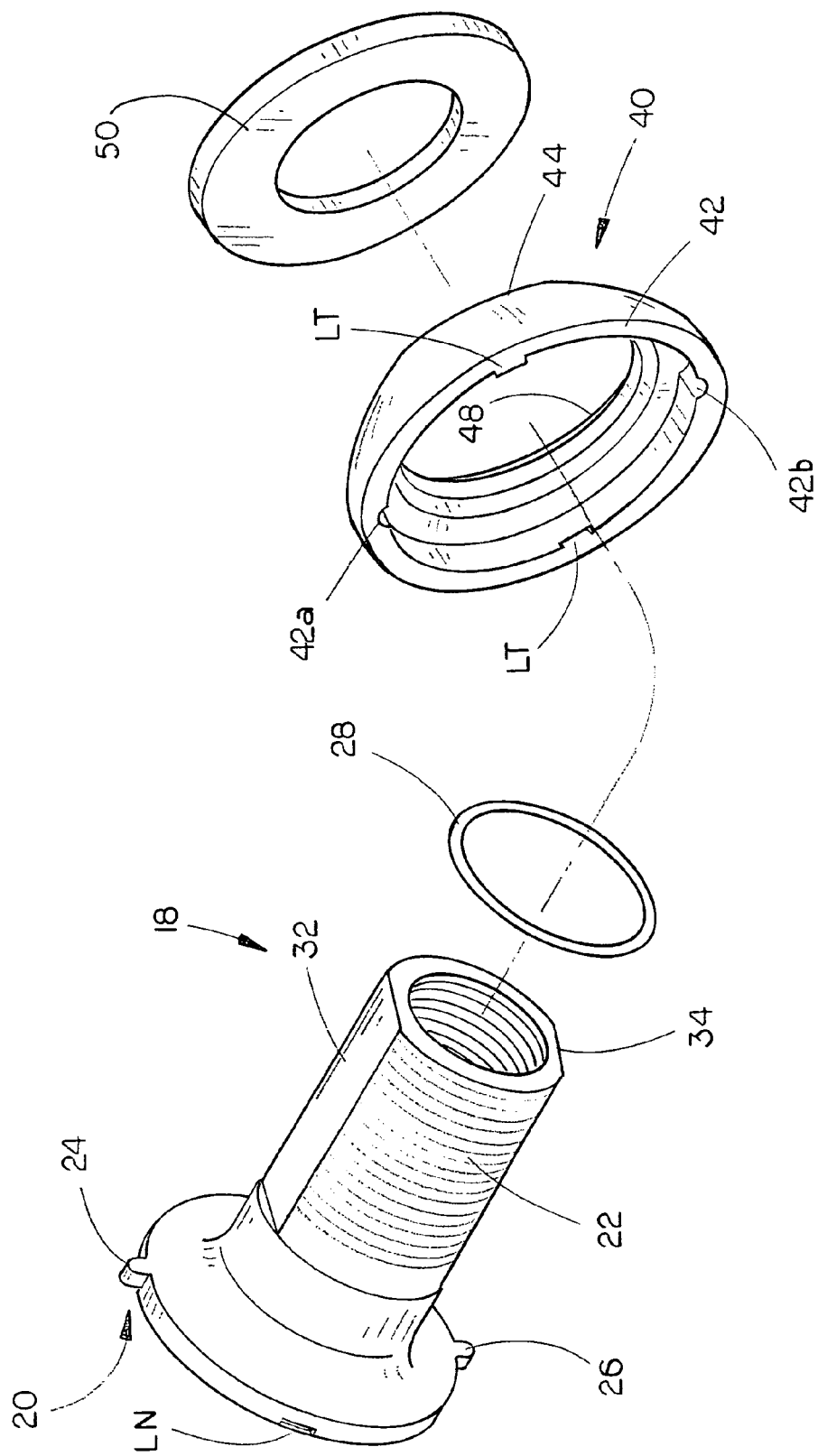
FIG. 4 is a partial perspective view illustrating the stem fitting, O-ring, base ring and seal washer of this invention.
Figure 5:
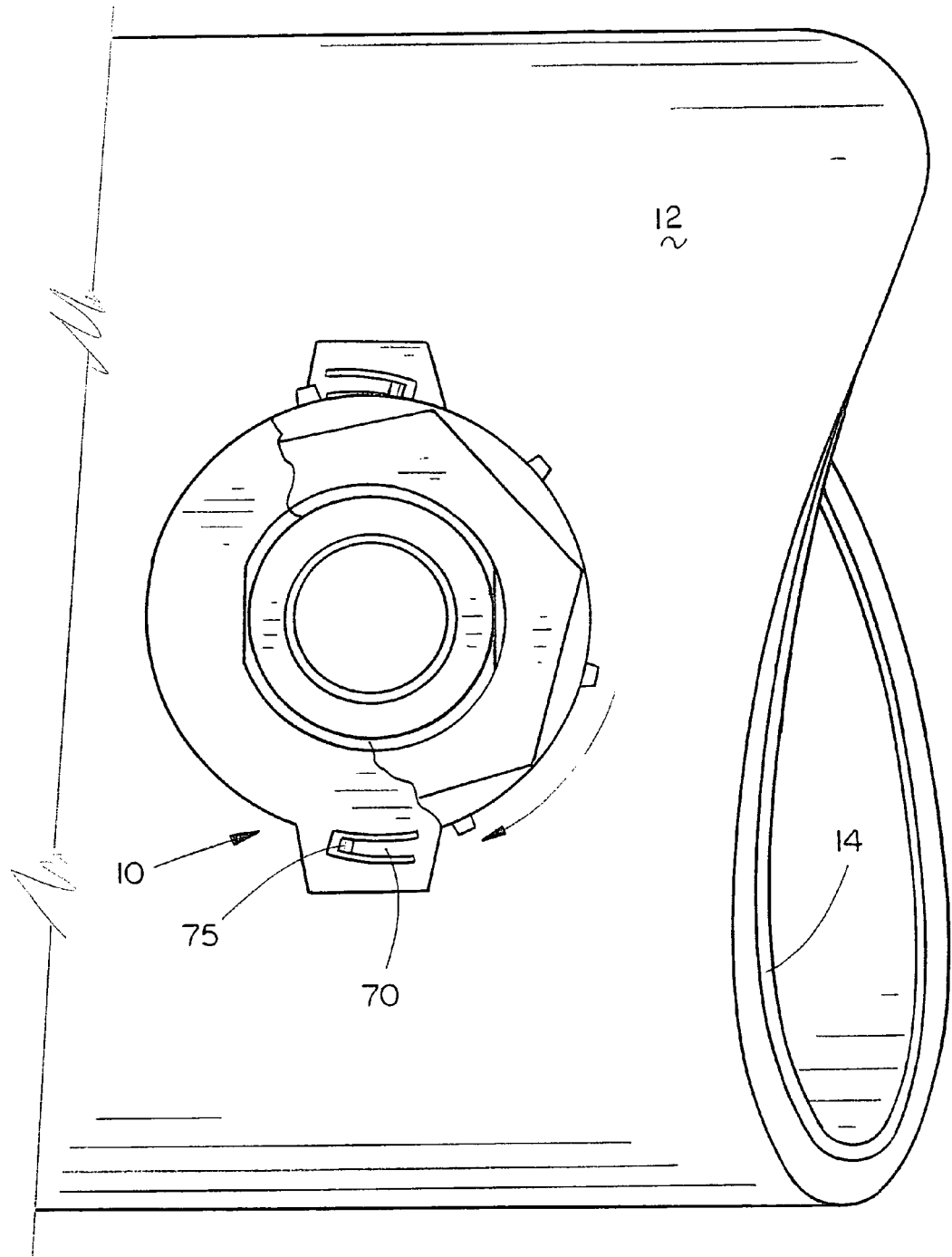
FIG. 5 is a top view of the fitting of this invention mounted on an irrigation pipe with portions thereof cut away to more fully illustrate the invention.
Figure 6:
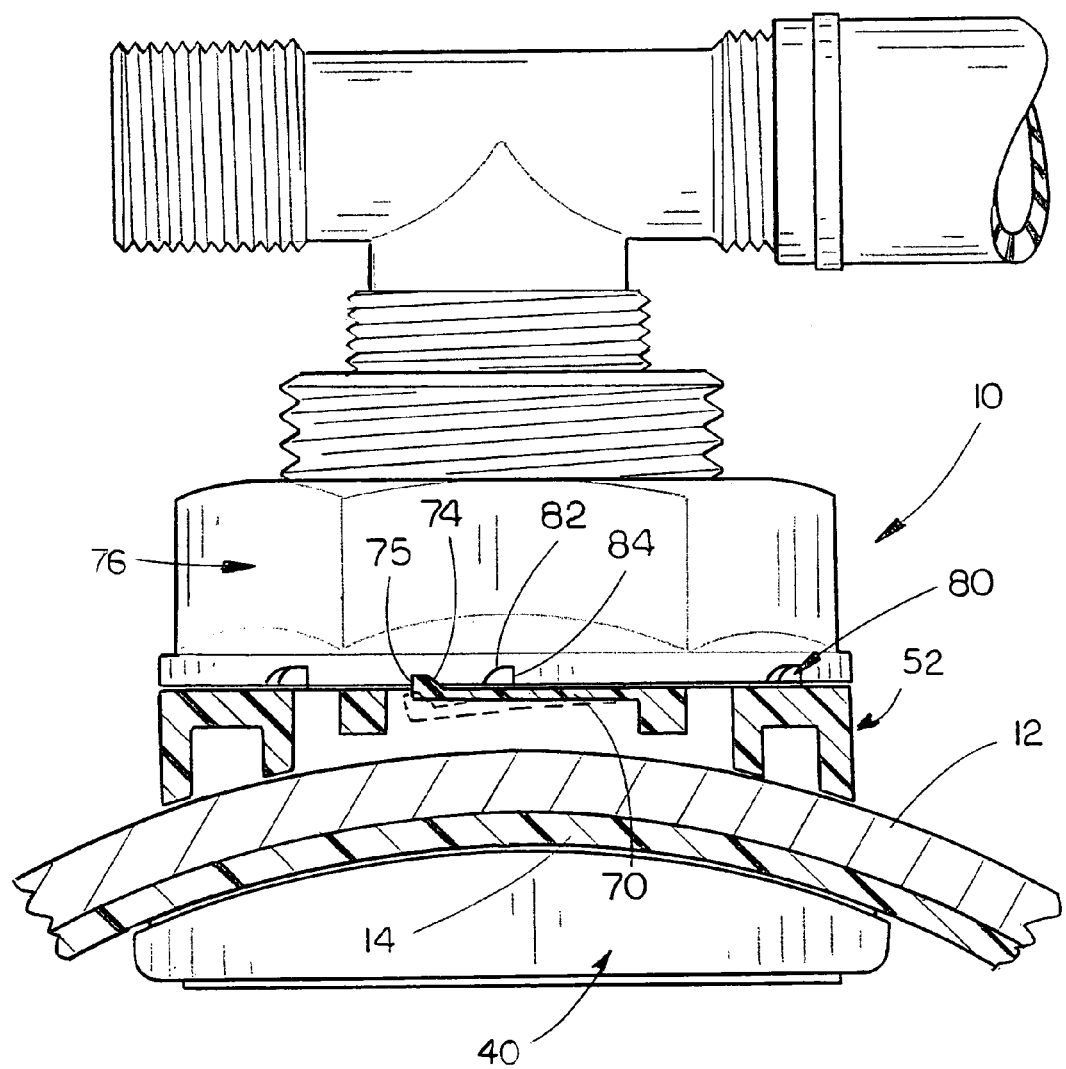
FIG. 6 is a partial vertical sectional view illustrating the locking mechanism which prevents the retaining nut from becoming loosened;.

The numeral 40 refers to a base ring having a lower face 42, an upper face 44 and a central opening 46. Upper face 44 is arcuate while lower face 42 is substantially flat. A pair of spaced-apart recesses or notches 42a and 42b are formed in lower face 42 which are adapted to receive protrusions 24 and 26, to provide indexing or timing between stem fitting 22 and base ring 40 (FIG. 4). A pair of spaced-apart locking tabs LT are formed in the lower face 42 which are adapted to be received within the locking notches LN to lock the base ring 40 to the base portion 20 of the stem fitting 18. The shape of upper face 44 is complementary to the inside diameter of pipe 12 and has a recess 48 formed therein which receives a seal washer 50 therein. The base ring 40 will be used with a pipe 12 having a six inch inside diameter. If the pipe 12 has an eight inch diameter, the base ring 40'will be utilized rather than base ring 40 since the radius of the upper face 44'of base ring 40'is less than the radius of upper face 44 of base ring 40. If pipes of other inside diameters are used, other base rings will be used which have an upper face complementary to that particular pipe diameter. The recessed portion 48 of base ring 40 has the same dimensions as recessed portion 48'so that seal washer 50 may be used with different base rings.

The numeral 52 designates an upper washer having an arcuate lower face 54, upper face 56, central opening 58 and laterally extending protrusions or ears 60 and 62. Lower face 54 is complementary in shape to the outside diameter of pipe 12 but may be used on other diameter pipes since it is not critical that face 54 be perfectly complementary to the outside diameter of pipe 12 since there is no need for a sealing relationship between washer 52 and the pipe 12. Washer 52 is provided with a pair of keys or flats 64 and 66 created in the side wall of central opening 58 which are received by flats 32 and 34, respectively, so that upper washer 52 aligns the stem fitting 22 with the pipe 10 or pipes of different diameters. Protrusions 60 and 62 are provided with resilient locking fingers 68 and 70, respectively, which have upstanding locking dogs or tips 72 and 74 at the free ends thereof. Each of the dogs 72 and 74 has a transverse surface 75 at the ends thereof.

Fitting 10 also includes a nut 76 having a disc or ring 78 at the lower end thereof. A plurality of radially spaced-apart locking members 80 extend laterally from the periphery of disc 78. Each of the locking members 80 is provided with an arcuate surface 82 and a transverse surface 84. Nut 76 is provided with internal threads 86 complementary to threads 30.

The fitting 10 is installed on the pipe 12 as follows: (1) O-ring 28 is placed upon the upper surface of base portion 20; (2) Universal seal washer 50 is placed in recess 48 of base ring 40; (3) base ring 40 is slipped onto stem portion 22 of stem fitting 18 and rotated with respect thereto until the notches 42a and 42b are aligned with protrusions 24 and 26, and are received thereby to provide a timing or indexing between the stem fitting 18 and base ring 40; (4) the locking tabs (LT) are received by the locking notches (LN) to lock the base ring to the stem fitting 18; (5) the assembly of steps 1-3 is inserted into one end of pipe 10 with a wire or the like until stem portion 22 of stem fitting 18 is aligned with the desired outlet opening in the pipe 10 so that the stem portion 22 may be extended outwardly through the opening; (6) the exposed stem portion 22 of the assembly is rotated until the flats 32 and 34 are parallel to the longitudinal axis of the pipe which causes the upper face 44 of base ring 40 to be properly positioned with respect to the inside diameter of the pipe; (7) upper washer 52 is aligned with stem portion 22 so that flats 64 and 66 are aligned with flats 32 and 34, respectively; (8) upper washer 52 is then moved downwardly with respect to stem portion 22 until lower face 54 of upper washer 52 engages the outside surface or diameter of pipe 10; (9) nut 76 is then threaded into threaded portion 30 of stem portion 22 of stem fitting 18; (10) as nut 76 is tightened onto stem portion 22, the arcuate leading edges or surfaces 82 of locking members 80 will eventually engage the arcuate surfaces of dogs 72 and 74 and will depress the same and pass thereof; and (11) the tightening of nut 76 is continued until the fitting 10 is securely mounted in the opening of the pipe 10.

If nut 76 inadvertently loosens somewhat with respect to upper washer 52 during usage, the transverse face or surface 84 of the locking members 80 will engage the transverse surfaces 75 of the dogs 72 and 74 which prevents further loosening of the nut 76. If it is desired to remove nut 76 from the stem portion 22, the fingers 68 and 70 must be manually depressed to permit nut 76 to be threadably loosened.

Thus, if the fitting 10 is to be used on a pipe having a six inch inside diameter, the components described immediately above will be utilized. If the fitting 10 is going to be used on a pipe with an eight inch inside diameter, the base ring 40'is substituted for the base ring 40 which substantially reduces required inventory to be used with pipes of different diameters.

Figure 7:
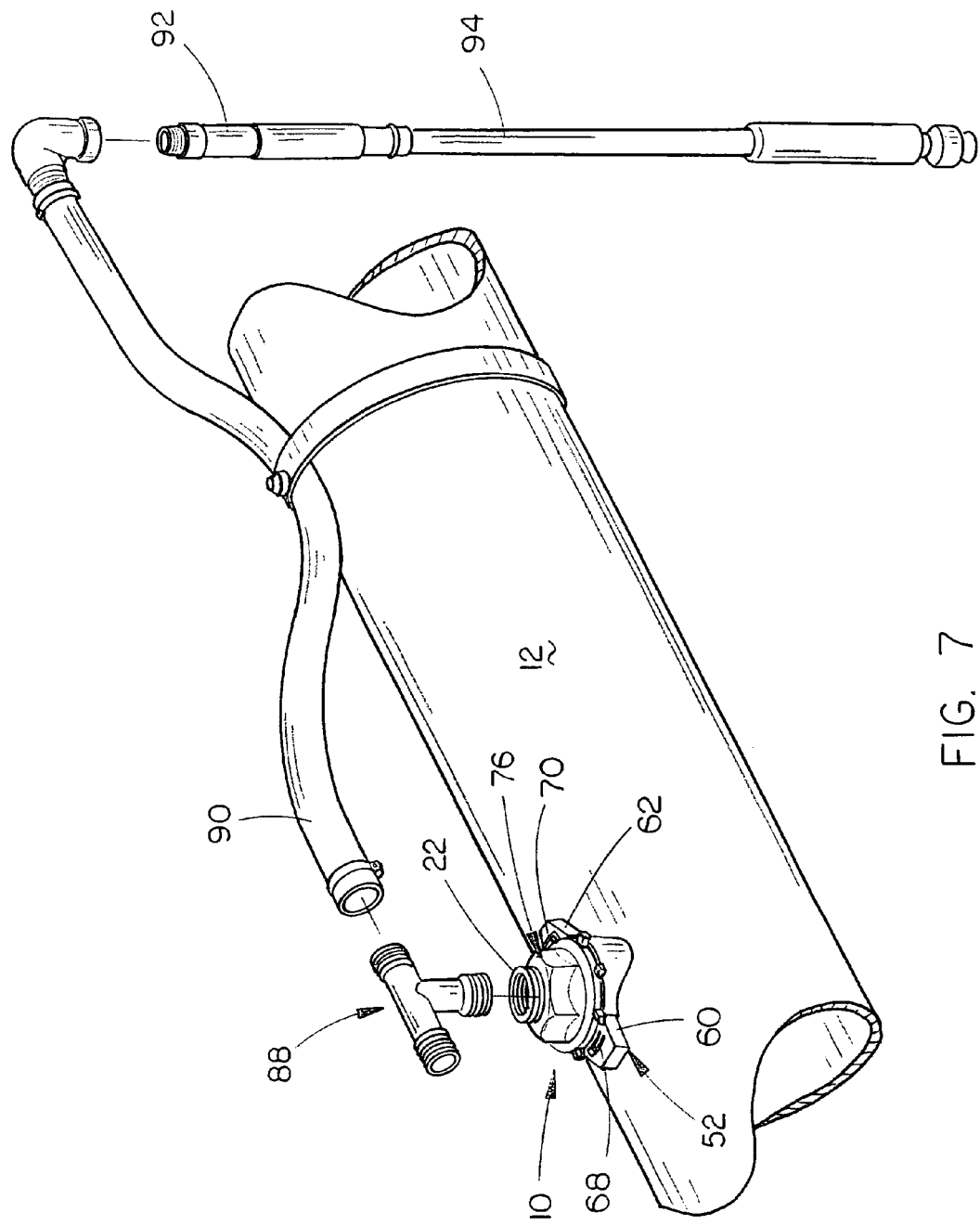
FIG. 7 is a partial exploded perspective view illustrating typical plumbing used with the fitting of this invention.
Figure 10:
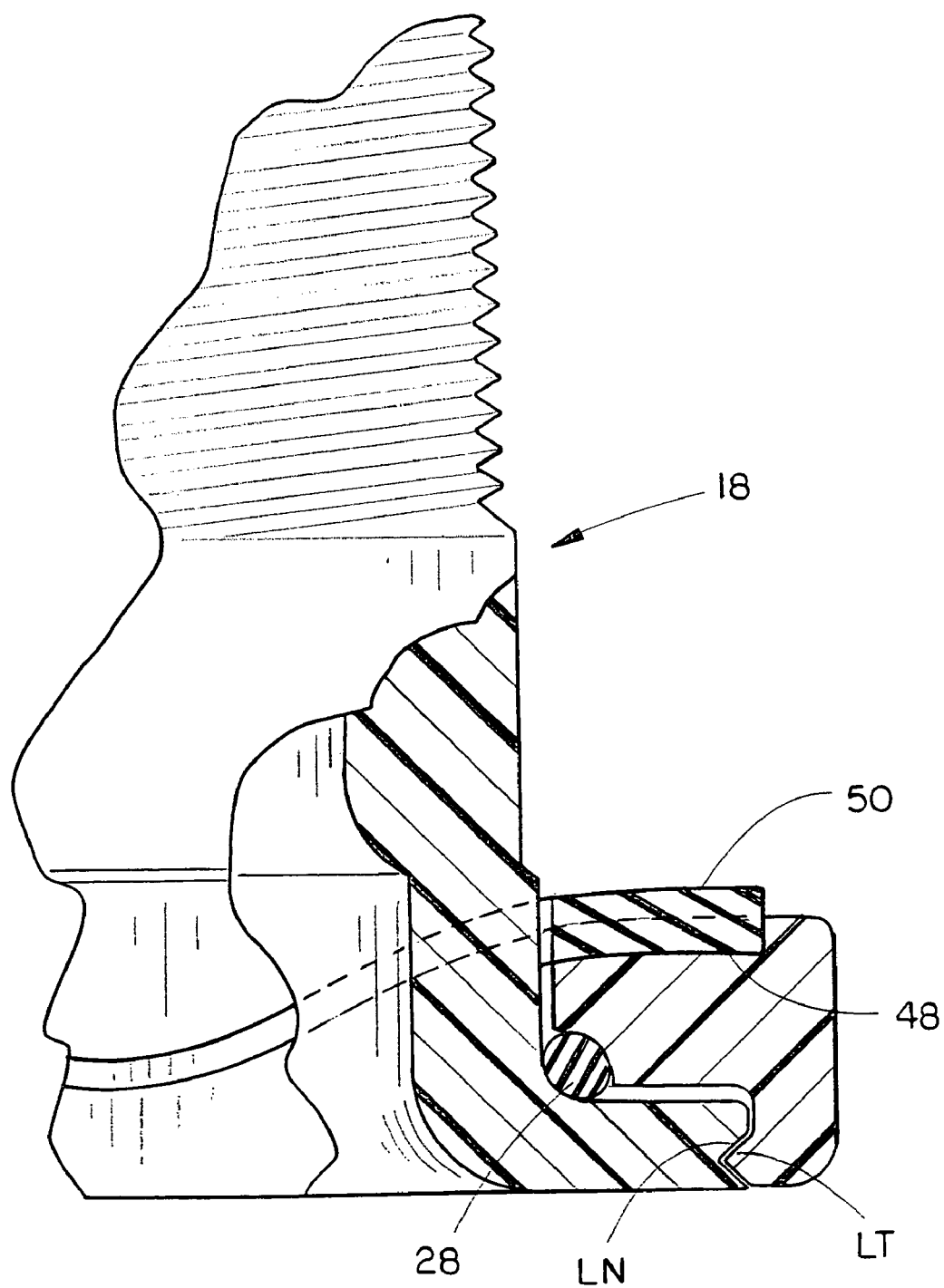
FIG. 10 is an enlarged partial sectional view illustrating the mating of the locking notches and locking tabs.

FIGS. 1 and 7 illustrate one manner in which the fitting 10 may be used on a pipe 12 of a mechanized irrigation system 13. A tee fitting 88 is threadably secured to the fitting 10. A water hose 90 is secured to one end of the fitting 88. Another water hose 90'would be secured to the other end of the fitting 88. The other end of hose 90 is secured to an insert connection 92 which is secured to a drop line generally indicated by the reference numeral 94 which extends to a sprinkler or regulator.

Instead of a tee fitting 88 being used in conjunction with the fitting 10, a PVC insert 96 may be threaded into the upper end of stem portion 22 (FIG. 8) with an elbow 98 and hose 100 being connected thereto. If it is desired to take the fitting 10 out of service, a plug 102 may be threaded into the stem portion 22. Plug 102 may be comprised of PVC, steel or other material.

Thus it can be seen that the invention accomplishes at least all of its stated objectives.

I claim:

1. In combination with a tubular irrigation pipe having a first predetermined inside diameter, an outer surface, a plastic lined inner surface, and at least one outlet opening formed therein, comprising:

a hollow stem fitting including a disc-shaped base portion and a stem portion extending upwardly therefrom;

said stem fitting having a central opening extending therethrough;

said stem portion having an outside diameter which is less than the diameter of said base portion;

said disc-shaped base portion having an upper face extending around said stem portion;

said stem portion having an upper end;

said base portion having a diameter which is greater than the diameter of the outlet opening;

said stem portion having an externally threaded portion and an internally threaded portion;

a ring-shaped base ring, having lower and upper faces, removably positioned on said base portion of said stem fitting;

said lower face of said base ring being complementary to said upper face of said base portion;

said upper face of said base ring being complementary to the inner surface of the pipe of first predetermined diameter;

said upper face of said base ring having a recessed area formed therein;

a seal washer positioned in said recessed area of said base ring;

said hollow stem fitting being positioned in the outlet opening so that said base portion, said base ring and said seal washer are positioned within the pipe with said stem fitting extending upwardly and outwardly through the outlet opening;

a generally ring-shaped upper washer mounted on said stem portion outwardly of the pipe and having lower and upper faces;

said lower face of said upper washer being complementary to the outer surface of the pipe;

said upper face of said upper washer being generally flat;

a nut threadably mounted on said externally threaded portion of said stem portion to sealably and physically maintain said hollow stem fitting on the pipe and so that sprinkler plumbing may be threadably received by said internally threaded portion of said stem portion;

said nut and said upper washer have cooperating nut locking means thereon.

2. The combination of claim 1 wherein said nut locking means prevents said nut from inadvertently threadably loosening with respect to said stem portion.

3. In combination with a tubular irrigation pipe having a first predetermined inside diameter, an outer surface, a plastic lined inner surface, and at least one outlet opening formed therein, comprising:

a hollow stem fitting including a disc-shaped base portion and a stem portion extending upwardly therefrom;

said stem fitting having a central opening extending therethrough;

said stem portion having an outside diameter which is less than the diameter of said base portion;

said disc-shaped base portion having an upper face extending around said stem portion;

said stem portion having an upper end;

said base portion having a diameter which is greater than the diameter of the outlet opening;

said stem portion having an externally threaded portion and an internally threaded portion;

a ring-shaped base ring, having lower and upper faces, removably positioned on said base portion of said stem fitting;

said lower face of said base ring being complementary to said upper face of said base portion;

said upper face of said base ring being complementary to the inner surface of the pipe of first predetermined diameter;

said upper face of said base ring having a recessed area formed therein;

a seal washer positioned in said recessed area of said base ring;

said hollow stem fitting being positioned in the outlet opening so that said base portion, said base ring and said seal washer are positioned within the pipe with said stem fitting extending upwardly and outwardly through the outlet opening;

a generally ring-shaped upper washer mounted on said stem portion outwardly of the pipe and having lower and upper faces;

said lower face of said upper washer being complementary to the outer surface of the pipe;

said upper face of said upper washer being generally flat;

a nut threadably mounted on said externally threaded portion of said stem portion to sealably and physically maintain said hollow stem fitting on the pipe and so that sprinkler plumbing may be threadably received by said internally threaded portion of said stem portion;

said upper washer including at least one resilient locking member which normally protrudes from said upper face thereof and which is movable between its normal protruding position to a retracted position;

said nut including a locking mechanism which is engageable with said locking member of said upper washer, when said locking member of said upper washer is in its protruding position, to prevent said nut from threadably loosening on said externally threaded portion of said stem fitting.

4. The combination of claim 3 wherein said upper washer includes at least two spaced-apart locking members.

5. The combination of claim 3 wherein said nut includes a plurality of spaced-apart locking mechanisms.

6. The combination of claim 3 wherein said locking mechanism on said nut comprises a lug having an arcuate leading side and a flat trailing side.

7. The combination of claim 6 wherein said arcuate leading side permits said lug to move past said locking member on said upper washer during the threadable tightening of said nut on said stem fitting and wherein said flat side of said lug engages said locking member of said upper washer to prevent the threadable loosening of said nut with respect to said stem fitting.

8. In combination with a tubular irrigation pipe having a first predetermined inside diameter, an outer surface, a plastic lined inner surface, and at least one outlet opening formed therein, comprising:
   a hollow stem fitting including a disc-shaped base portion and a stem portion extending upwardly therefrom;
   said stem fitting having a central opening extending therethrough;
   said stem portion having an outside diameter which is less than the diameter of said base portion;
   said disc-shaped base portion having an upper face extending around said stem portion;
   said stem portion having an upper end;
   said base portion having a diameter which is greater than the diameter of the outlet opening;
   said stem portion having an externally threaded portion and an internally threaded portion;
   a ring-shaped base ring, having lower and upper faces, removably positioned on said base portion of said stem fitting;
   said lower face of said base ring being complementary to said upper face of said base portion;
   said upper face of said base ring being complementary to the inner surface of the pipe of first predetermined diameter;
   said upper face of said base ring having a recessed area formed therein;
   a seal washer positioned in said recessed area of said base ring;
   said hollow stem fitting being positioned in the outlet opening so that said base portion, said base ring and said seal washer are positioned within the pipe with said stem fitting extending upwardly and outwardly through the outlet opening;
   a generally ring-shaped upper washer mounted on said stem portion outwardly of the pipe and having lower and upper faces;
   said lower face of said upper washer being complementary to the outer surface of the pipe;
   said upper face of said upper washer being generally flat;
   a nut threadably mounted on said externally threaded portion of said stem portion to sealably and physically maintain said hollow stem fitting on the pipe and so that sprinkler plumbing may be threadably received by said internally threaded portion of said stem portion;
   said base portion having at least one protrusion extending laterally therefrom which is receivable by a recessed portion in said lower face of said base ring to provide timing between said stem fitting and said base ring.

9. In combination with a tubular irrigation pipe having a first predetermined inside diameter, an outer surface, a plastic lined inner surface, and at least one outlet opening formed therein, comprising:
   a hollow stem fitting including a disc-shaped base portion and a stem portion extending upwardly therefrom;
   said stem fitting having a central opening extending therethrough;
   said stem portion having an outside diameter which is less than the diameter of said base portion;
   said disc-shaped base portion having an upper face extending around said stem portion;
   said stem portion having an upper end;
   said base portion having a diameter which is greater than the diameter of the outlet opening;
   said stem portion having an externally threaded portion and an internally threaded portion;
   a ring-shaped base ring, having lower and upper faces, removably positioned on said base portion of said stem fitting;
   said lower face of said base ring being complementary to said upper face of said base portion;
   said upper face of said base ring being complementary to the inner surface of the pipe of first predetermined diameter;
   said upper face of said base ring having a recessed area formed therein;
   a seal washer positioned in said recessed area of said base ring;
   said hollow stem fitting being positioned in the outlet opening so that said base portion, said base ring and said seal washer are positioned within the pipe with said stem fitting extending upwardly and outwardly through the outlet opening;
   a generally ring-shaped upper washer mounted on said stem portion outwardly of the pipe and having lower and upper faces;
   said lower face of said upper washer being complementary to the outer surface of the pipe;
   said upper face of said upper washer being generally flat;
   a nut threadably mounted on said externally threaded portion of said stem portion to sealably and physically maintain said hollow stem fitting on the pipe and so that sprinkler plumbing may be threadably received by said internally threaded portion of said stem portion;
   said stem portions having at least one flat surface formed on the exterior surface thereof which receives a key surface on said upper washer to align said stem fitting with said upper washer.

10. In combination with a tubular irrigation pipe having a first predetermined inside diameter, an outer surface, a plastic lined inner surface, and at least one outlet opening formed therein, comprising:
   a hollow stem fitting including a disc-shaped base portion and a stem portion extending upwardly therefrom;
   said stem fitting having a central opening extending therethrough;
   said stem portion having an outside diameter which is less than the diameter of said base portion;
   said disc-shaped base portion having an upper face extending around said stem portion;
   said stem portion having an upper end;
   said base portion having a diameter which is greater than the diameter of the outlet opening;
   said stem portion having an externally threaded portion and an internally threaded portion;
   a ring-shaped base ring, having lower and upper faces, removably positioned on said base portion of said stem fitting;
   said lower face of said base ring being complementary to said upper face of said base portion;
   said upper face of said base ring being complementary to the inner surface of the pipe of first predetermined diameter;

said upper face of said base ring having a recessed area formed therein;

a seal washer positioned in said recessed area of said base ring;

said hollow stem fitting being positioned in the outlet opening so that said base portion, said base ring and said seal washer are positioned within the pipe with said stem fitting extending upwardly and outwardly through the outlet opening;

a generally ring-shaped upper washer mounted on said stem portion outwardly of the pipe and having lower and upper faces;

said lower face of said upper washer being complementary to the outer surface of the pipe;

said upper face of said upper washer being generally flat;

a nut threadably mounted on said externally threaded portion of said stem portion to sealably and physically maintain said hollow stem fitting on the pipe and so that sprinkler plumbing may be threadably received by said internally threaded portion of said stem portion;

said base portion having at least one locking notch formed therein which is adapted to receive a locking tab on said base ring to removably lock said base ring to said base portion.

11. The combination of claim 10 wherein said base portion has at least one locking notch formed therein which is adapted to receive a locking tab on said base ring to removably lock said base ring to said base portion.

* * * * *